US012776881B2

(12) United States Patent
Visoz et al.

(10) Patent No.: US 12,776,881 B2
(45) Date of Patent: Oct. 27, 2026

(54) TRANSMISSION OF SIGNALLING INFORMATION

(71) Applicant: Orange, Issy-les-Moulineaux (FR)

(72) Inventors: Raphaël Visoz, Chatillon Cedex (FR); Eric Hardouin, Chatillon Cedex (FR)

(73) Assignee: Orange, Issy-les-Moulineaux (FR)

( * ) Notice: Subject to any disclaimer, the term of this patent is extended or adjusted under 35 U.S.C. 154(b) by 303 days.

(21) Appl. No.: 18/560,374

(22) PCT Filed: Apr. 26, 2022

(86) PCT No.: PCT/FR2022/050790
§ 371 (c)(1),
(2) Date: Nov. 10, 2023

(87) PCT Pub. No.: WO2022/238635
PCT Pub. Date: Nov. 17, 2022

(65) Prior Publication Data

US 2024/0243882 A1 Jul. 18, 2024

(30) Foreign Application Priority Data

May 12, 2021 (FR) ....................................... 2105039

(51) Int. Cl.
*H04L 5/00* (2006.01)
*H04L 12/18* (2006.01)
*H04W 72/30* (2023.01)

(52) U.S. Cl.
CPC ........ *H04L 5/0053* (2013.01); *H04L 12/1881* (2013.01); *H04W 72/30* (2023.01)

(58) Field of Classification Search
CPC .. H04L 5/0053; H04L 12/1881; H04W 72/30; H04W 72/541; H04W 72/23
See application file for complete search history.

(56) References Cited

U.S. PATENT DOCUMENTS

2013/0114581 A1* 5/2013 Jones .................... H04W 72/30 370/336
2014/0355493 A1* 12/2014 Niu ....................... H04L 12/189 370/312

(Continued)

FOREIGN PATENT DOCUMENTS

WO WO 2009/121025 A2 10/2009
WO WO 2010/036006 A2 4/2010

(Continued)

OTHER PUBLICATIONS

Takeda et al., "Understanding the Heart of the 5G Air Interface: An Overview of Physical Downlink Control Channel for 5G New Radio (NR)", IEEE Communications Standards Magazine, Sep. 23, 2020.

(Continued)

*Primary Examiner* — Kibrom T Hailu
(74) *Attorney, Agent, or Firm* — Knobbe, Martens, Olson & Bear, LLP

(57) ABSTRACT

A method for transmitting signalling information from a base station to at least two terminals associated with the base station. The method includes transmitting at least two physical unicast control channels each intended for one of the at least two terminals, each physical unicast control channel carrying a unicast control message carrying transmission parameters intended to be used for the transmission of a multicast control message, and each physical unicast control channel being encoded with a temporary network identifier uniquely identifying the terminal for which it is intended, the multicast control message carrying at least two sets of transmission parameters for use in transmitting pay load data to the at least two terminals respectively.

15 Claims, 3 Drawing Sheets

(56) References Cited

U.S. PATENT DOCUMENTS

| | | | | |
|---|---|---|---|---|
| 2017/0359849 | A1* | 12/2017 | Zhang | H04W 74/04 |
| 2018/0145805 | A1* | 5/2018 | Maaref | H04W 4/80 |
| 2018/0262882 | A1 | 9/2018 | You et al. | |
| 2019/0260542 | A1* | 8/2019 | Wu | H04L 5/0051 |
| 2022/0263638 | A1* | 8/2022 | Zhao | H04L 5/0053 |

FOREIGN PATENT DOCUMENTS

| | | | |
|---|---|---|---|
| WO | WO 2014/147341 | A1 | 9/2014 |
| WO | WO 2014/147345 | A1 | 9/2014 |
| WO | WO 2016/069270 | A1 | 5/2016 |

OTHER PUBLICATIONS

LTE; Evolved Universal Terrestrial Radio Access (E-UTRA); Physical layer procedures (3GPP TS 36.213 version 11.0.0 Release 11), ETSI, Oct. 2012.
5G; NR; Physical layer procedures for control (3GPP TS 38.213 version 15.10.0 Release 15), ETSI, Jul. 2020.
5G; NR; Multiplexing and channel coding (3GPP TS 38.212 version 15.9.0 Release 15). ETSI, Jul. 2020.
International Search Report and Written Opinion for International Application No. PCT/FR2022/050790 dated Sep. 9, 2022.

* cited by examiner

TRANSMISSION OF SIGNALLING INFORMATION

CROSS-REFERENCE TO RELATED APPLICATIONS

This application is filed under 35 U.S.C. § 371 as the U.S. National Phase of Application No. PCT/FR2022/050790 entitled "TRANSMISSION OF SIGNALLING INFORMATION" and filed Apr. 26, 2022, and which claims priority to FR 2105039 filed May 12, 2021, each of which is incorporated by reference in its entirety.

BACKGROUND

Field

The development relates to the general field of telecommunications.

More particularly, it relates to signalling, in a communications network, resources intended to be used for the transmission of payload data from a base station to terminals.

Thus, the development has a preferred, yet non-limiting application, in the context of 5G NR ("New Radio") or LTE ("Long Term Evolution") mobile networks, as defined by the 3GPP ("Third Generation Partnership Project"), and in particular in the downlink, i.e. in the direction of communication from the base station (or eNodeB) to the mobile terminals (or UE, standing for "User Equipment").

Description of the Related Technology

The capacity of mobile communication cellular networks, and in particular that of LTE or NR networks, is limited by interferences. These interferences may be of different kinds. The most damaging ones in terms of capacity of the cellular network include in particular:

- the SU-MIMO (standing for "Single User-Multiple Input Multiple Output") interference related to the use of multiple antennas in transmission and in reception, and which corresponds to the interference generated between MIMO data streams allocated to a same terminal;
- the MU-MIMO (standing for "Multiple User-Multiple Input Multiple Output") interference which corresponds to the interference generated between MIMO data streams allocated to different terminals; and
- the inter-cell interference, generated between signals transmitted by different cells and intended for different terminals.

Various methods allowing reducing the effect of these interferences on the performances of the network are known from the prior art.

In particular, it is known to use, at the terminals, non-linear receivers implementing interference cancellation techniques, such as MMSE-SIC receivers (standing for "Successive Interference Cancellation"). In general, and for simplicity, in the case of one single interferer, such a receiver estimates the interfering data stream (corresponding to a MU-MIMO or inter-cell type interference) by implementing, for example, a step of decoding (channel) the signal of the corresponding interferer. Then, based on this estimation of the stream, the estimation of the channel of the interferer and of the knowledge of the transmission parameters allocated to this interferer, the receiver reconstructs the interfering signals received by the terminal. Afterwards, the reconstructed interfering signal is subtracted from the signal received by the terminal, the signal thus cleared of the interference being used to detect the useful signal intended for the terminal.

The non-linear receivers SIC can process one or more interfering data stream(s) intended for one or more so-called interfering terminal(s). Nonetheless, the interference cancellation process implemented by these non-linear receivers requires the knowledge of the transmission parameters of the interferer(s) and in particular, in the context of an LTE or NR telecommunications network, of the modulation and coding scheme associated with each interferer, of the physical resource blocks (or PRB, standing for "Physical Resource Block"), possibly of the dedicated pilot sequence (referred to as DMRS, standing for "DeModulation Reference Sequence") if it is used, and of the network temporary identifier or RNTI ("Radio Network Temporary Identifier") uniquely assigned to the interferer terminal to identify it on the cell to which it is attached.

For these reasons, the MMSE-SIC receivers with channel decoding of the interference are commonly considered to process the SU-MIMO interference, since the terminal equipped with the MMSE-SIC receiver has access to all of the transmission parameters of the different streams transmitted thereto. On the other hand, their use for the processing of MU-MIMO and inter-cell downlink interference is more complex. To better illustrate this statement, one should recall how the transmission parameters are allocated in an LTE or NR network, and more particularly how the signalling of the transmission parameters thus allocated is performed.

For simplicity, only the inter-cell interference is treated hereafter, bearing in mind that equivalent statements also apply to MU-MIMO interference.

The transmission parameters, intended to be used for the transmission of payload data to a terminal, are allocated to each terminal by the base station controlling the cell to which the terminal is attached. They are, except for the RNTI identifier, communicated to each terminal via a dedicated physical control channel called PDCCH ("Physical Downlink Control Channel"). The RNTI identifier is signaled to the terminal in a dedicated signalling message, and more specifically in a configuration message transmitted on the PDSCH ("Physical Downlink Shared Channel") channel managed by the upper layers of the network, and in particular by the radio resource control layer or RRC ("Radio Resource Control") layer. The PDCCH channel is organized according to several possible formats, so-called DCI formats (standing for "Downlink Control Information"). A DCI format includes several fields, each field carrying a particular piece of information (for example transport blocks or PRBs ("Physical Resource Block" allocated (one or two transport blocks can be allocated), modulation and coding schemes or MCSs (standing for "Modulation and Coding Scheme") allocated for each transport block, etc.). Afterwards, the information bits of a PDCCH channel (i.e. the bits of the DCI format) are associated with a CRC ("Cyclic Redundancy Check") code to enable error detection. The particularity of this CRC code is that it is scrambled with the RNTI identifier of the terminal to which the PDCCH channel is intended. This enables the terminal to validate that the PDCCH that it decodes is actually intended thereto. Indeed, if another terminal (which has a different RNTI identifier) attempts to verify the validity of the PDCCH channel using this other RNTI identifier, the verification of the CRC code returns an error.

Afterwards, the information bits as well as the bits of the CRC are encoded according to a convolutional code in LTE or according to a polar code in NR, then scrambled by a sequence specific to the cell, before being modulated in QPSK and then transmitted. The effective efficiency of the convolutional or polar code, which depends on the efficiency of the code as well as the rate adaptation performed at the output of the encoder in order to adapt the number of encoded bits to the available resources, is adapted to the protection level required by the radio conditions of the terminal to which the PDCCH is intended. Thus, a PDCCH for a terminal located in good radio conditions (for example close to the base station serving it) does not need a lot of protection and is transmitted with a high effective efficiency, or in other words over a small number of resources. Conversely, a PDCCH channel with a low effective efficiency and occupying a higher number of resources is allocated to a terminal located in poor radio conditions.

In LTE or NR networks, the resources occupied by a PDCCH channel allocated to a terminal are not known in advance by the latter. Hence, the terminal should test a set of possible resource combinations, and for each candidate combination attempt to decode a PDCCH channel potentially transmitted on these resources with its RNTI identifier, to determine whether it is intended thereto. The set of candidate resources for a given terminal is called search space, and described in the document 3GPP TS 36.213 v11.0.0 entitled "Evolved Universal Radio Access; Physical Layer Procedures (Release 11)", September 2012, in section 9.1.1 in particular. In particular, the position of the search space depends on the value of the RNTI identifier. The same method has been extended in NR and is described in the document TS38.213 V15.10.0 entitled "Physical layer procedures for control".

Henceforth, it should be clearly understood that the only possible solution, in order to enable a victim terminal of inter-cell interference or MU-MIMO to acquire the knowledge of the transmission parameters of its interferers in order to be able to implement an MMSE-SIC processing method to cancel this interference, is to attempt to blindly decode all of the PDCCH channels of the interfering cell(s) (i.e. cells serving as interfering terminals for the terminal equipped with the MMSE-SIC receiver).

In other words, for each interfering cell, the "victim" terminal should examine each PDCCH channel likely to have been transmitted on search space resources corresponding to different RNTI values, until finding all of the PDCCH channels actually transmitted. Since the victim terminal has no knowledge of the RNTI identifiers assigned to the other terminals, a test of all possible RNTI values should be performed. Once all of the PDCCHs transmitted by the considered interfering cell are decoded, the victim terminal could know which are the terminals of this cell that are transmitted on the same resources as it and which therefore represent interferers. In addition, the victim terminal has access to the transmission parameters of its interferers and can thus cancel their interference using an MMSE-SIC technique.

In NR (the same principle applies to LTE), decoding of the PDCCH by a terminal is based on the blind decoding of several time-frequency resource allocation positions given by the search space sets ("Search Space Set"). Each position, for a given resource allocation size, is so-called PDCCH candidate. The resource allocation size corresponds to an aggregation level ("Aggregation Level" or AL) of control channel elements ("Control Channel Elements" or CCE). A CCE is associated with time resources (OFDM symbol) and frequency resources (OFDM sub-carriers) via the resource element groups ("Resource Element Groups" or REG), with or without interlacing.

Each attempt to decode, at a given position and aggregation level, is carried out according to the size of an expected control message, the "Downlink Control Information" (DCI). A PDCCH is found when the result of the decoding passes the test of a CRC itself scrambled by an RNTI identifier which should be known to the terminal. The RNTI used for the transmission of unicast data in a cell is primarily the C-RNTI, which identifies an active terminal (in connected RRC mode) in the cell. Of course, there are other RNTIs having a specific unicast use such as CS-RNTI, MCS-C-RNTI, etc. it should be noted that a specific size of DCI can implicitly indicate a PDCCH format, since any other format of different size is decoded with an error even though the time-frequency allocation is the same.

This solution has two major drawbacks: first of all, the blind decoding of the different PDCCH channels of a cell is a very complex and particularly long operation because of the implemented processing. Moreover, it consumes much energy of the battery of the terminal. Furthermore, the application of such blind decoding to several interfering cells to enable the use of an MMSE-SIC processing technique in order to eliminate inter-cell interference is difficult to consider a fortiori.

In addition, the need to test for each PDCCH candidate all possible values for the RNTI identifier (there are $2^{16}$), in order to determine both the latter and the validity of the PDCCH candidate, makes this method almost impossible to implement with realistic computing means.

The patent application WO2014/147341 suggests a solution enabling the terminals attached to the same cell as an interfering terminal to quickly identify the transmission parameters of this interfering terminal and thus to be able to implement a successive cancellation of interference in order to eliminate the MU-MIMO interference generated by this interfering terminal.

SUMMARY OF CERTAIN INVENTIVE ASPECTS

The development provides an alternative solution in the form of a method for transmitting signalling information from a base station to at least two terminals attached to said base station, comprising the transmission of at least two unicast physical control channels each intended for one of said at least two terminals. By unicast physical channel, it should be understood a channel of the physical layer intended for a specific user which provides the means for transmitting by radio the data originating from the MAC layer (or from transport channels). For example, a unicast PDCCH physical control channel corresponds to a subset consisting of elements of the available radio resource and conveys the DCI information (and the control elements necessary for detection thereof).

According to the development, each unicast physical control channel conveys a unicast control message carrying transmission parameters (i.e. transmission format and/or time-frequency resources) intended to be used for the transmission of a multicast control message, and each unicast physical control channel is encoded using a network temporary identifier uniquely identifying the terminal to which it is intended.

The multicast control message carries at least two sets of transmission parameters intended to be used for the transmission of payload data to said at least two terminals respectively.

Thus, the development provides a solution enabling a group of terminals attached to a base station to simply obtain the transmission parameters intended to be used for the transmission of the payload data to all of the terminals of this group, by transmitting in the unicast physical control channels the transmission parameters intended to be used for the transmission of a multicast control message, the multicast control message carrying the transmission parameters intended to be used for the transmission of the payload data to all of the terminals of this group.

In other words, according to the suggested solution, at least two unicast physical control channels point to the same multicast control message, carrying the transmission parameters intended to be used for the transmission of payload data to the destination terminals of the unicast physical control channels.

Thus, the different terminals can obtain multicast control information, i.e. shared by several terminals, using their network temporary identifiers and the unicast physical control channels.

For example, the network temporary identifiers are of the RNTI ("Radio Network Temporary Identifier") type, the physical control channels are of the PDCCH ("Physical Downlink Control Channel") type, and the unicast and multicast control messages are of the DCI ("Downlink Control Information") type.

According to a particular embodiment, the sets of transmission parameters present in the multicast control message identify at least one same time-frequency resource associated with the transmission of payload data to at least two terminals, i.e. identify at least one common time-frequency resource allocated to at least two terminals.

In this manner, these terminals can detect that they are interfering. Thus, a "victim" terminal can implement a successive interference cancellation technique in order to eliminate, or at the very least reduce, the MU-MIMO interference generated by an "interferer" terminal.

According to a particular feature, the multicast control message may be scrambled by a scrambling sequence specific to a cell controlled by the base station, and the scrambling sequence may be transmitted in at least one of the unicast physical control channels.

In this manner, it is possible to process the inter-cell interference by transmitting, in the unicast physical control channels, information necessary for decoding the multicast control message, and, consequently, for obtaining the transmission parameters of the payload data intended for the other terminals.

For example, such a scrambling sequence carries a cell identifier, like the PCI ("Physical Cell ID").

According to another feature, the multicast control message may be encoded while taking the reception conditions of the terminals into account.

In particular, the used encoding is that one necessary for decoding the information by the terminal having the least good reception conditions, so that all of the terminals of a group can decode the multicast control message.

According to a particular embodiment, the unicast control message has a specific format, and is transmitted over at least one time-frequency resource distinct from a time-frequency resource used to transmit a unicast control message of the same size according to a predefined format.

For example, if the unicast control message is of the DCI type, the predefined format may be the 1-0 format or the 1-1 format, as defined in the document TS38.212 V15.9.0 entitled "Multiplexing and channel coding". In particular, the specific format according to the development may be denoted as the "format 1-x".

In other words, at least one time-frequency resource (selected from among several candidates) carrying the unicast control message (with the format 1-x) is always distinct from a time-frequency resource used to transmit another control format with the same size.

Alternatively, at least one of the unicast physical control channels conveys an indicator signalling that the sets of transmission parameters of the payload data are transmitted in another channel. In this manner, the terminal receiving the unicast physical control channel (with the format 1-x) detects that the unicast control message does not directly carry the transmission parameters intended to be used for the transmission of payload data (even though its size is the same as the size of a unicast control message according to another format transmitted on the same time-frequency resources), but sends back to a multicast control message which carries the transmission parameters of the payload data. For example, such an indicator may be a "explicit" indicator, like a specific sequence inserted into a field of the unicast control message (for example a bit or a sequence of bits), a specific network temporary identifier uniquely identifying the destination terminal of the unicast physical control channel and signalling that the sets of transmission parameters of payload data are transmitted in another channel (denoted, for example, MU-C-RNTI), etc.

Alternatively, the unicast control message has a specific size, distinct from that of a predefined format (for example one bit longer than the format 1-1) allowing distinguishing the specific format 1-x from other formats having a different DCI size occupying the same time-frequency resources. In this case, it consists of an implicit indicator signalling that the sets of transmission parameters of the payload data are transmitted in another channel.

In this manner, a wrong interpretation of the content of the unicast message is avoided.

In particular, the multicast control message may be transmitted in a physical control channel (for example of the multicast PDCCH type), or in a shared physical channel (for example of the PDSCH type).

The development also relates to a corresponding base station.

Such a base station is particularly suitable for implementing the previously-described method for transmitting signalling information. For example, it consists of an eNodeB or a gNodeB. Of course, such a base station may include the different features relating to the method according to the development, which may be combined or considered separately. Thus, the features and advantages of the base station are the same as those of the previously-described method. Consequently, they are not detailed further.

The development also relates to a reception method intended to be implemented by a terminal attached to a base station implementing the following steps of:

- decoding a unicast physical control channel intended for said terminal, using a network temporary identifier uniquely identifying said terminal,
- said unicast physical control channel conveying a unicast control message carrying transmission parameters intended to be used for the transmission of a multicast control message, said multicast control message carrying at least two sets of transmission parameters, including a first set of transmission parameters intended to be used for the transmission of payload data to said terminal and a second set of transmission parameters intended to be used for the transmission of payload data to another terminal attached to said base station, decoding said multicast control message transmitted using the transmission parameters carried by said unicast control message, receiving a useful signal originating from said base station, transmitted using said first set of transmission parameters.

As already indicated, the suggested solution thus enables a first terminal attached to a base station to quickly identify the transmission parameters (i.e. transmission format and/or time-frequency resources) of payload data allocated to this terminal, as well as the transmission parameters of payload data allocated to other terminals attached to this base station, potentially interfering with this first terminal.

In particular, if the first terminal detects, based on the sets of received payload data transmission parameters, that at least one time-frequency resource intended to be used for the transmission of payload data to this terminal is shared with a second terminal, it may implement the reconstruction of at least one interfering signal intended for the second terminal and the subtraction of the signal interfering with the useful signal.

In this manner, the first terminal may implement a successive interference cancellation technique.

In particular, the reception method may implement descrambling of the multicast control message based on a scrambling sequence specific to a cell controlled by the base station, transmitted in the unicast physical control channel.

Such a step implements an operation that is the inverse of the scrambling step implemented by the base station.

According to another embodiment, the reception method implements, prior to the step of decoding said multicast control message, a step of detecting an indicator conveyed by the unicast physical control channel, or of a specific size of the unicast control message conveyed by said unicast physical control channel, signalling that the sets of payload data transmission parameters are transmitted in another channel.

In this manner, the terminal receiving the unicast control channel detects that the unicast control message does not directly carry the payload data transmission parameters, but sends back to a multicast control message, and may implement a step of decoding the multicast control message, which carries the payload data transmission parameters.

The development also relates to a corresponding terminal.

Such a terminal is particularly suitable for implementing the previously-described reception method. For example, such a terminal is a mobile phone, a smartphone, a laptop computer, etc., in particular able to communicate over an LTE or NG network. According to a particular embodiment, such a terminal is equipped with a non-linear receiver of the MMSE-SIC type, in other words, a non-linear receiver implementing a successive interference cancellation technique.

Of course, the terminal could include the various features related to the method according to the development, which may be combined or considered separately. Thus, the features and advantages of the terminal are the same as those of the previously-described method. Consequently, they are not detailed further.

The development also relates to one or more computer program(s) including instructions for the implementation of a method for transmitting signalling information or a reception method as described hereinabove when this or these program(s) are executed by at least one processor.

BRIEF DESCRIPTION OF THE DRAWINGS

Other features and advantages of the development will appear more clearly upon reading the following description of a particular embodiment, given just as an illustrative and non-limiting example, and from the appended drawings, wherein.

DETAILED DESCRIPTION OF CERTAIN ILLUSTRATIVE EMBODIMENTS

General Principle

The development relates to the context of a communications network implementing a base station and at least two terminals.

The general principle of the development is based on the transmission of unicast physical control channels from the base station to each terminal of a group of terminals, each unicast physical control channel pointing to a multicast control information carrying the transmission parameters intended to be used for the transmission of payload data to the different terminals of the group. In this manner, when a terminal decodes the unicast physical control channel intended thereto, it obtains the transmission parameters of the multicast control message and can thus decode the multicast control message. By decoding the multicast control message, it obtains the transmission parameters of payload data allocated thereto as well as the transmission parameters of payload data allocated to the other terminals of the group, for at least one time transmission interval.

In particular, the terminals of a group are paired in MU-MIMO, i.e. share at least one time-frequency resource for receiving payload data from a base station over a given time transmission interval.

According to at least one embodiment according to which the unicast control channel is a PDDCH, the suggested solution thus enables each terminal of a group of terminals (for example of terminals paired in MU-MIMO) to know the allocation of resources and/or the transmission format of the other terminals of this group, while retaining the conventional processing of a PDCCH channel, since the PDDCH carries transmission parameters (intended to be used for the transmission of the multicast control message according to the development, while, according to the prior art, they are intended to be used for the transmission of payload data to the terminal). In particular, the suggested solution does not require an increase in the number of operations of blind decoding of the PDCCH channel and is not based on the knowledge of the network identifiers of the other terminals.

In particular, the suggested solution adapts without difficulty to MU-MIMO structures with a large number of paired terminals.

Figure 1:
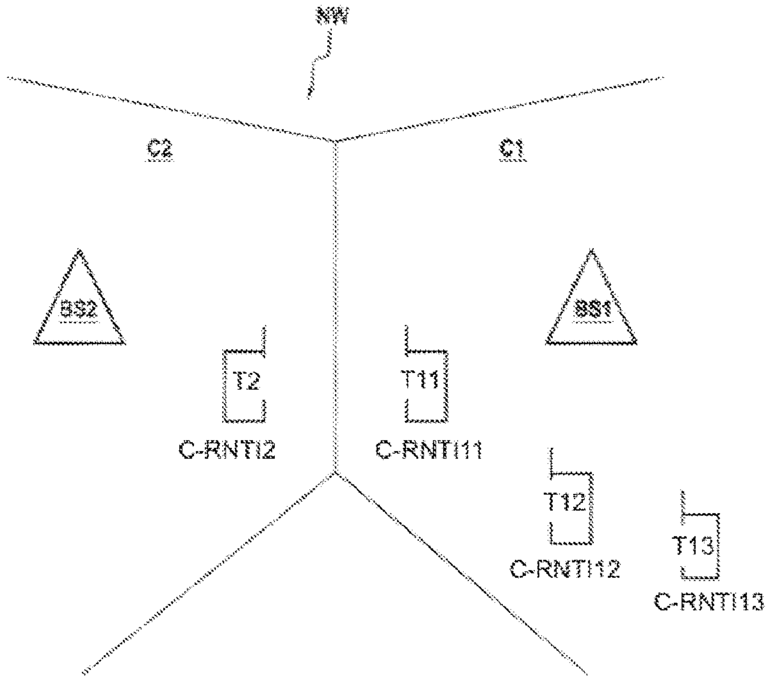
FIG. 1 illustrates an example of a communications network in which the development can be implemented.

FIG. 1 illustrates an example of a system implementing a base station and at least two terminals in a communications network, for example a cellular network NW.

In a particular embodiment, the cellular telecommunications network NW is an NR or LTE mobile network, as defined by the 3GPP standard. Each cell of the network NW is controlled by a base station (or eNodeB) serving the different terminals (or UEs, standing for "User Equipment") attached to the base station. A base station may serve several cells or sectors, a terminal is typically attached to a cell and to the base station. In "Dual Connectivity/Carrier Aggregation" type modes, the terminal may be attached to several cells and/or several base stations. In the latter case, a terminal can receive several PDCCHs, each associated with the time-frequency resources of a cell.

For illustration, two cells C1 and C2 of the cellular network NW are shown in FIG. 1, the cell C1 being controlled by the base station BS1 and the cell C2 being controlled by the base station BS2. Each base station serves one or more terminal(s) present in the cell(s) controlled thereby. Thus, in FIG. 1, a terminal T11, a terminal T12 and a terminal T13 attached to the cell C1 and served by the base station BS1, and a terminal T2 attached to the cell C2 and served by the base station BS2, are considered. Of course, there is no limitation to the number of considered base stations, nor to the number of cells managed by a base station, nor to the number of terminals attached to each cell.

A temporary identifier is assigned to each terminal attached to a cell by the base station controlling this cell, in order to communicate over the network NW. In a manner known to a person skilled in the art, this identifier is a dedicated identifier, i.e. served for the terminal and which uniquely identifies it on the cell to which it is attached. Thus, in the example considered herein, the base station BS1 assigns a network temporary identifier C-RNTI11 to the terminal T11, a network temporary identifier C-RNTI12 to the terminal T12 and a network temporary identifier C-RNTI13 to the terminal T13, and the base station BS2 assigns a network temporary identifier C-RNTI2 to the terminal T2.

Figure 2:
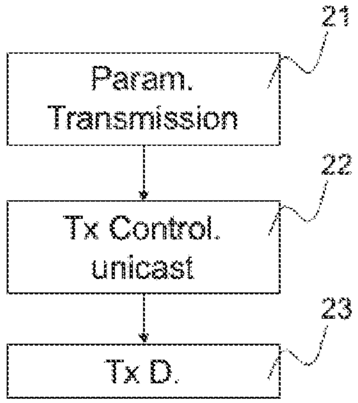
FIG. 2 shows the main steps implemented by a base station according to an embodiment of the development.

FIG. 2 illustrates the main steps implemented by a base station according to the development, for example the station BS1.

The base station BS1 determines (21), for a time transmission interval ("Time Transmission Interval"), the transmission parameters intended to be used for the transmission of payload data to the different terminals attached to the base station (in order to insert them into the multicast control message), and the transmission parameters intended to be used for the transmission of the multicast control message (in order to insert them into the unicast control message of each unicast control channel).

For example, the transmission parameters comprise the allocation of time-frequency resources and/or the transmission format for the communications transmitted by the base station. For example, the allocation of resources comprises information such as time position of the occupied OFDM symbols and the frequency position of the occupied sub-carriers, or group of 12 sub-carriers (PRBs) per occupied OFDM symbols. For example, the transmission format comprises information on the encoding, modulation, number of spatial layers, and/or reference signals for channel estimation (DMRS, standing for "Demodulation Reference Signal"), etc., used for the communications transmitted by the base station.

For example, the base station BS1 determines a first set of transmission parameters allocated to the terminal T11, a second set of transmission parameters allocated to the terminal T12, and a third set of transmission parameters allocated to the terminal T13.

It should be noted that if two sets of transmission parameters identify the same time-frequency resource associated with the transmission of payload data to two distinct terminals for the same time transmission interval, the useful signal transmitted from the base station to one of the terminals will interfere with the useful signal transmitted from the base station to the other of the terminals.

These different sets of transmission parameters are intended to be transmitted by the base station in the multicast control message. Hence, the multicast control message carries at least two sets of transmission parameters each allocated to one of the terminals. For example, such a multicast control message comprises, for each terminal, an identifier of the terminal and the transmission parameters allocated to this terminal. Thus, according to the example illustrated in FIG. 1, the multicast control message intended to be transmitted by the base station BS1 comprises the following information: C-RNTI11: transmission parameters of the terminal 11; C-RNTI12: transmission parameters of the terminal 12; C-RNTI13: transmission parameters of the terminal 13.

In particular, the multicast control message may be encoded before transmission. In particular, it is encoded while taking into account the reception quality of the terminals intended to decode the different sets of transmission parameters carried thereby.

In particular, as indicated hereinabove, the sets of transmission parameters carried by the multicast control message are defined for each unicast control channel, i.e. for each terminal, in particular for the terminals paired with MU-MIMO. In order to ensure the proper reception of all transmission parameters by all terminals, the encoding is that one necessary for decoding the information by the terminal having the least good reception conditions.

Thus, for example, if the terminal T13 has at least good reception conditions, for example because it is located farther away from the base station BS1 than the terminals T11 and T12, then the code used to encode the multicast control message should be robust enough to enable decoding of the multicast control message by the terminal T13.

The multicast control message may also be scrambled, for example at the output of the encoder and before the modulator. In particular, it may be scrambled by a known scrambling sequence of the different terminals, or transmitted to some terminals in their unicast control channel.

For example, the scrambling sequence is a scrambling sequence specific to the cell controlled by the base station, such as its PCI identifier ("Physical Cell ID"). Thus, the multicast control message intended to be transmitted by the base station BS1 may be scrambled by the identifier PCI_1 of the cell C1. In particular, the scrambling sequence may be transmitted in at least one unicast physical control channel.

According to the example illustrated in FIG. 1, if it is considered that the terminals T11, T12 and T13 belong to the cell C1, that the terminal T2 belongs to the interfering cell C2, and that the multicast control message belongs to the cell C1 (i.e. is transmitted by the base station BS1, carries the transmission parameters allocated to the terminals T11, T12 and T13 of the cell C1, and scrambled by the identifier PCI_1 of the cell C1), then it is necessary to supply the identifier PCI_1 to the terminal T2 in its unicast physical control channel, in addition to the transmission parameters of the multicast control message, so that the terminal T2 could decode the multicast control message of the cell C1.

In this manner, the terminal T2 can obtain the transmission parameters of the terminals T11, T12 and T13 of the cell C1, and implement an advanced reception technique based on decoding of the signals transmitted to the other terminals.

According to this particular embodiment, the suggested solution therefore allows processing the MU-MIMO interference as well as the inter-cell interference. In particular, it allows using a scrambling sequence that is not known to all terminals in order to scramble the multicast control message, while offering the possibility of transmitting, in the unicast control channels, this scrambling sequence necessary for decoding the multicast control message, and consequently for decoding the transmission parameters and therefore of the data of the other terminals.

Before transmitting the multicast control message, the base station BS1 may transmit (22) at least two unicast physical control channels each intended for one of the terminals, for example a first physical control channel dedicated to the terminal T11, denoted PDCCH1, a second physical control channel dedicated to the terminal T12, denoted PDCCH2, and a third physical control channel dedicated to the terminal T13, denoted PDCCH3.

According to the development, each unicast physical control channel conveys a unicast control message carrying the transmission parameters intended to be used for the transmission of the multicast control message, and each unicast physical control channel is encoded using a network temporary identifier uniquely identifying the terminal to which it is intended.

Thus, the first unicast physical control channel PDCCH1 is encoded by the first network temporary identifier C-RNTI11, and conveys a unicast control message identifying in particular the time-frequency resource(s) that will be used to transmit the multicast control message.

The second unicast physical control channel PDCCH2 is encoded by the second network temporary identifier C-RNTI12 (different from the first network temporary identifier C-RNTI11), and conveys the same unicast control message identifying in particular the time-frequency resource(s) that will be used to transmit the multicast control message.

The third unicast physical control channel PDCCH3 is encoded by the third network temporary identifier C-RNTI13 (different from the first network temporary identifier C-RNTI11 and the second network temporary identifier C-RNTI12), and conveys the same unicast control message identifying in particular the time-frequency resource(s) that will be used to transmit the multicast control message.

Afterwards, the base station may transmit (23) payload data to the terminals, using the sets of transmission parameters allocated to each of the terminals.

Figure 3:
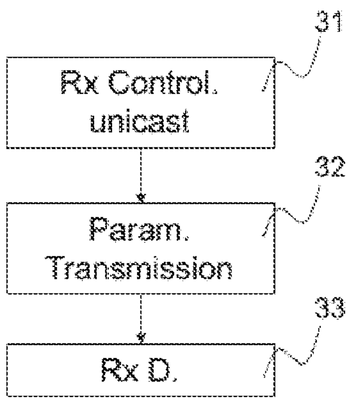
FIG. 3 shows the main steps implemented by a terminal according to an embodiment of the development.

FIG. 3 illustrates the main steps implemented by at least one terminal according to the development.

Conventionally, each terminal independently decodes the unicast physical control channel intended thereto, by blind decoding of several time-frequency resource allocation positions of a physical control channel candidate, given by a search space set.

For example, the terminal T11 decodes (31) the unicast physical control channel intended thereto, using its network temporary identifier C-RNTI11.

By decoding its unicast physical control channel, the terminal T11 detects that the unicast control message does not directly carry the transmission parameters that are allocated to the terminal T11, but points to a multicast control message (i.e. carries the transmission parameters intended to be used by the base station to transmit the multicast control message).

The terminal T11 can then decode (32) the multicast control message transmitted using the transmission parameters identified in the unicast control message.

Thus, the terminal T11 may obtain the first set of transmission parameters allocated thereto, as well as the sets of transmission parameters allocated to the other terminals T12 and T13.

Knowing the transmission parameters allocated thereto, the terminal T11 may receive (33) a useful signal originating from the base station BS1, transmitted using the first set of transmission parameters.

In particular, if the first set of transmission parameters and second set of transmission parameters identify the same time-frequency resource allocated to the terminal T11 and to the terminal T12 respectively, the useful signal transmitted from the base station to the terminal T12 will be considered as a signal interfering with the useful signal transmitted from the base station to the terminal T11, and vice versa.

In particular, knowing the second set of transmission parameters obtained from decoding of the multicast control message, the terminal T11 can implement an advanced reception technique, by reconstructing the interfering signal (transmitted from the base station BS1 to the terminal T12) and by subtracting it from the useful signal (transmitted from the base station BS1 to the terminal T1).

It should be noted that while it is possible to spatially multiplex the Unicast PDCCHs in NR (by sending the PDCCHs of different users on the same time-frequency resource) because these can be pre-encoded or sent in the form of a spatially directional beam. On the other hand, the DMRSs of each PDCCH cannot be orthogonal (by construction). A terminal may be configured with a specific identifier for the initialization of the DMRS sequence. Based on the knowledge of its resource allocation and of that of the other terminals after decoding the multicast control message, each terminal can then decode its message but also those intended for the other terminals. Thus, it can implement advanced reception strategies (turbo/iterative type) based on decoding of the other terminals.

Description of One Embodiment

A particular embodiment is described hereinafter, according to which the network temporary identifiers are of the RNTI type, the physical control channels are of the PDCCH type, and the unicast and multicast control messages are of the DCI type.

Returning back to the communication network illustrated in FIG. 1, the base station BS1 therefore generates, for at least one time interval, a multicast DCI carrying a first set of transmission parameters allocated to the terminal T11, a second set of transmission parameters allocated to the terminal T12, and a third set of transmission parameters allocated to the terminal T13. The base station BS1 also generates, for this time interval, a unicast DCI carrying transmission parameters intended to be used for the transmission of the multicast DCI.

Afterwards, the base station BS1 transmits PDCCH channels to the different terminals T11, T12 and T13.

Figure 4:
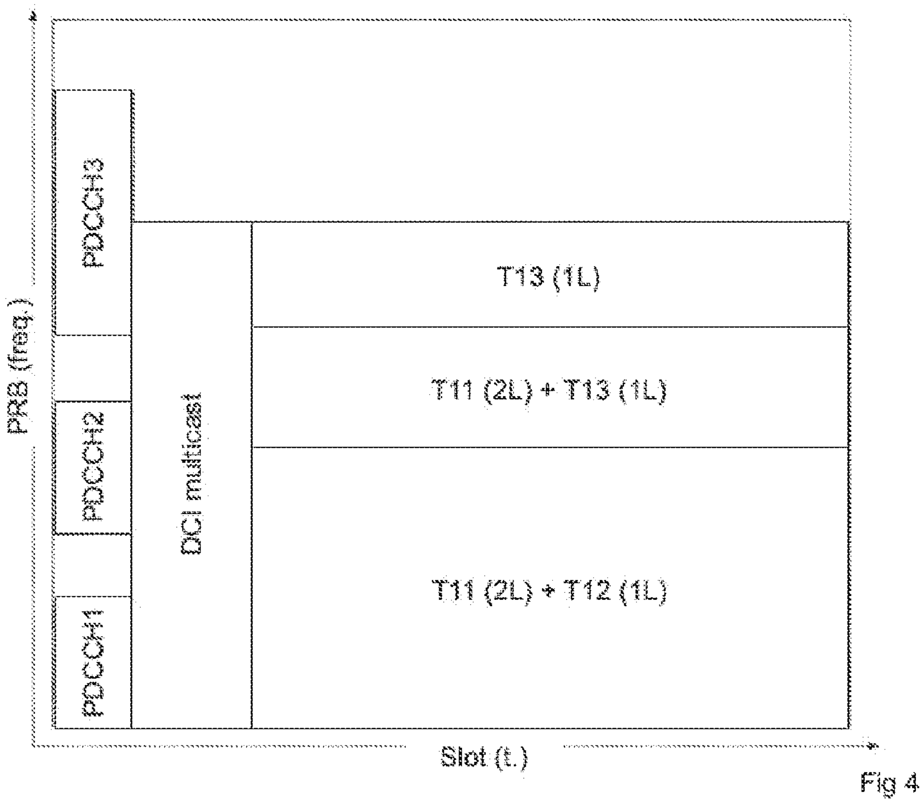
FIG. 4 illustrates an example of information transmitted from the base station to the terminals attached to the base station within a time transmission interval.

For example, as illustrated in FIG. 4, for a time interval (TTI or slot), the base station BS1 transmits a first channel PDCCH1 intended for the terminal T11, encoded by the identifier C-RNTI11, carrying the unicast DCI pointing to the multicast DCI, and having an aggregation level AL4. the base station BS1 also transmits a second channel PDCCH2 intended for the terminal T12, encoded by the identifier C-RNTI12, carrying the unicast DCI pointing to the DCI even multicast, and having an aggregation level AL4. Finally, the base station BS1 transmits a third channel PDCCH3 intended for the terminal T13, encoded by the identifier C-RNTI13, carrying the unicast DCI pointing to the multicast DCI, and having an aggregation level AL8.

The base station BS1 also sends (using the transmission parameters carried by the unicast DCI) the multicast DCI carrying the first, second and third sets of transmission parameters allocated respectively to the terminals T11, T12 and T13, possibly scrambled by the identifier of the cell C1: PCI_C1. For example, the multicast DCI is transmitted on a single spatial layer ("multicast single antenna port transmission").

Afterwards, the payload data can be transmitted from the base station to the terminals T11, T12 and T13, using the transmission parameters allocated to the terminals T11, T12 etT13. For example, the payload data intended for the terminal T11 are transmitted on two spatial layers (2L), the payload data intended for the terminal T12 are transmitted on a spatial layer (1L), and the payload data intended for the terminal T13 are transmitted on a spatial layer (1L). In addition, as illustrated in FIG. 4, it is considered that the three terminals T11, T12 and T13 are paired in MU-MIMO, and that the terminals T11 and T12 share time-frequency resources, as well as the terminals T11 and T13.

On the terminal side, each terminal independently decodes its PDDCH. The three PDDCHs (PDDCH1, PDDCH2 and PDDCH3) point on the multicast DCI decodable by all of the terminals paired in MU-MIMO, giving the allocation of resources and the transmission format of each of the paired terminals.

Thus, the terminal T11 can detect that it shares resources with the terminals T12 and T13, and subtract the residual interference from the terminals T12 and T13 on its transmission, determined thanks to the knowledge of the transmission parameters of the terminals T12 and T13.

Several examples of unicast DCI are described hereinafter.

As indicated in connection with the prior art, the PDCCH channel is conventionally organized according to several possible formats, so-called DCI formats. Hence, the unicast control message corresponds to a DCI format.

In NR, for the downlink unicast transmissions, there are conventionally two DCI formats using a network temporary identifier, such as the identifier C-RNTI, MCS-C-RNTI, CS-RNTI: the format 1-0 and the format 1-1. The format 1-0, also called "fallback format", has a small size corresponding to an allocation with a unique spatial layer.

In LTE, this type of formats in the downlink direction also exists.

For a destination terminal of a Unicast PDCCH according to an embodiment of the development to be able to simply determine that the PDCCH that is intended thereto does not directly carry the transmission parameters allocated to the terminal, but returns to a multicast DCI (which carries the transmission parameters allocated to the terminal), the unicast control message carried by the Unicast PDCCH has a specific format, denoted the format 1-x, different from a predefined format of the 1-0 or 1-1 type.

According to a first embodiment, a unicast DCI in the format 1-x is transmitted over at least one time-frequency resource distinct from a time-frequency resource used to transmit a unicast DCI of the same size according to a predefined format of the 1-0 or 1-1 type.

Thus, the time-frequency resource carrying the unicast DCI in the format 1-x, selected from among several candidate time-frequency resources, is always distinct from a time-frequency resource used to transmit another unicast DCI format of the same size, so that there is no ambiguity of interpretation of the content of the unicast DCI in the format 1-x.

According to this first embodiment, the base station thus ensures that a PDCCH candidate carrying a unicast DCI with this new format 1-x never coincides (CCE allocation position and size) with another PDCCH candidate carrying a DCI unicast to a predefined format (the format 1-0 or 1-1 for example) configured by the RRC layer.

Thus, this new format 1-x may have any size, equal to that of a predefined format (format 1-0 or 1-1 for example) or different. Moreover, a PDCCH candidate carrying a unicast DCI with this new format 1-x can be associated with the same RNTI as a PDCCH candidate carrying a unicast DCI in a predefined format (C-RNTI for example).

In the case where the new format 1-x re-uses the size of the format 1-1 or of the format 1-0, if the number of unicast information exceeds the capacity of DCI format 1-0, then the size of the format 1-1 is used. In particular, the size of the format 1-1 is used when a scrambling sequence or quasi-colocation relationships ("TCI state") for the estimation of the channel for decoding the multicast DCI requires a large number of bits.

According to a second embodiment, this new format 1-x carries an indicator signalling that the payload data transmission parameters are transmitted in the multicast DCI (for example in another Unicast PDCCH or in a PDSCH).

According to a first example, such an indicator is a specific sequence inserted in a field of the unicast control message, i.e. in a field of the unicast DCI in the format 1-x. Thus, a field of the format 1-x bears a specific bit or sequence of bits allowing differentiating it from a predefined format (for example the format 1-0 or 1-1).

According to a second example, such an indicator is a specific size of the unicast control message, i.e. a specific size of the unicast DCI in the format 1-x. For example, the format 1-x has a size different from a predefined format (for example the format 1-0 or 1-1), for example longer by one bit. Thus, since the size of the different formats is configured at the terminals, a terminal decoding a PDDCH channel can simply detect the format used for the unicast DCI.

According to a third example, such an indicator is a specific network temporary identifier uniquely identifying the destination terminal of the PCCDH and signalling that the payload data transmission parameters are transmitted in a multicast DCI. For example, the format 1-x is associated with a new unicast RNTI, for example the RNTI MU-C-RNTI, differ from the unicast RNTI associated with a predefined format (for example the format 1-0 or 1-1), for example the C-RNTI.

This second embodiment enables a terminal to detect that the payload data transmission parameters are transmitted in the multicast DCI, in particular in the case where a PDCCH candidate carrying a unicast DCI with this new format 1-x coincides (CCE allocation position and size) with another PDCCH candidate carrying a unicast DCI with a predefined format (for example the format 1-0 or 1-1) configured by the RRC layer.

In particular, this new format 1-x of the unicast DCI carries the transmission parameters intended to be used by the base station for the transmission of the multicast DCI, i.e. at least one time-frequency resource allocated to the transmission of the multicast DCI (the multicast DCI containing the information necessary for decoding a group of terminals). As already indicated, this multicast DCI not only carries the transmission parameters of the payload data intended for the destination terminal of the PDCCH carrying the unicast DCI to the new format 1-x, but also the transmission parameters of the other terminals belonging to a group of terminals, for example paired in MU-MIMO. In this manner, the destination terminal of the PDCCH carrying the unicast DCI to the new format 1-x can better process the residual interference.

More generally, the suggested solution, based on a unicast DCI pointing to a multicast DCI, enables each terminal of a group to have the resource allocation and transmission format information of the other terminals of the group.

In particular, the multicast DCI can carry scrambling sequence information necessary for decoding by the other terminals. It is not limited in size. The multicast DCI may be encoded similarly to the PDSCH with LDPC encoding or follow an encoding strategy close to the PDCCH with polar codes and a QPSK modulation.

On the terminal side, the number of decoding operations of the PDCCH is related to the number of format sizes (of message sizes to be decoded in number of useful bits) to be tested for the terminal. The mechanism for detecting this new unicast DCI format is based on several alternatives, according to the above-described embodiments.

Some terminals provided with advanced receivers are configured by the network via the RRC layer for searching for this new format 1-x of the DCI, or for this new use of the unicast DCI (a DCI format size that can be used for several uses).

In particular, it is possible that the RRC layer does not configure a terminal for searching for a predefined format of the DCI, for example the format 1-1, with C-RNTI (i.e. no search space defined for a terminal—"UE specific search space set" or USS—configured with the format 1-1 associated with the C-RNTI for this terminal), but only with the new format 1-x with C-RNTI. In this case, for a transmission of payload data with no identified interfering terminals to this terminal, the multicast DCI indicated by the format 1-x with C-RNTI carries only the allocation and the transmission format of the data intended for this terminal.

Simplified Structure of a Base Station and of a Terminal

Figure 5:
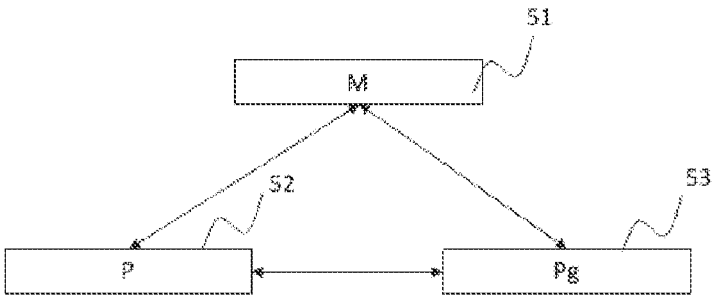
FIG. 5 shows the simplified structure of a base station according to a particular embodiment.

The simplified structure of a base station according to at least one above-described embodiment is now disclosed with reference to FIG. 5.

As illustrated in FIG. 5, such a base station, for example the base station BS1, comprises at least one memory 51 comprising a buffer memory, at least one processing unit 52, equipped for example with a programmable computing machine or a dedicated computing machine, for example a processor P, and controlled by the computer program 53, implementing steps of the method for transmitting signalling information according to at least an embodiment of the development.

Upon initialization, the code instructions of the computer program 53 are for example loaded into a RAM memory before being executed by the processor of the processing unit 52.

The processor of the processing unit 52 implements steps of the previously-described method for transmitting signalling information, according to the instructions of the computer program 53, to transmit at least two unicast physical control channels each intended for a terminal attached to the base station, each unicast physical control channel conveying a unicast control message carrying transmission parameters intended to be used for the transmission of a multicast control message, each unicast physical control channel being encoded using a network temporary identifier uniquely identifying the terminal to which it is intended, and the multicast control message carrying at least two sets of transmission parameters intended to be used for the transmission of payload data to said at least two terminals respectively.

Figure 6:
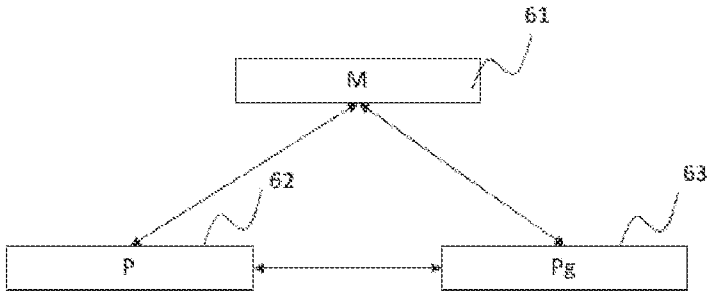
FIG. 6 shows the simplified structure of a terminal according to a particular embodiment.

Finally, referring to FIG. 6, the simplified structure of a terminal according to at least one above-described embodiment is disclosed.

As illustrated in FIG. 6, such a terminal, for example the terminal T11, comprises at least one memory 61 comprising a buffer memory, at least one processing unit 62, equipped for example with a programmable computing machine or a dedicated computing machine, for example a processor P, and controlled by the computer program 63, implementing steps of the reception method according to at least an embodiment of the development.

Upon initialization, the code instructions of the computer program 63 are for example loaded into a RAM memory before being executed by the processor of the processing unit 62.

The processor of the processing unit 62 implements steps of the above-described reception method, according to the instructions of the computer program 63, to:

- decode a unicast physical control channel intended for the terminal, using a network temporary identifier uniquely identifying the terminal, the unicast physical control channel conveying a unicast control message carrying transmission parameters intended to be used for the transmission of a multicast control message, the multicast control message carrying at least two sets of transmission parameters, including a first set of transmission parameters intended to be used for the transmission of payload data to the terminal and a second set of transmission parameters intended to be used for the transmission of payload data to another terminal attached to the base station,
- decode a multicast control message transmitted using the transmission parameters carried by the unicast control message,
- receive a useful signal originating from the base station, transmitted using the first set of transmission parameters.

The invention claimed is:

1. A method for transmitting signalling information from a base station to at least two terminals attached to the base station,

- comprising transmitting at least two unicast physical control channels each intended for one of the at least two terminals,
- each unicast physical control channel conveying a unicast control message carrying transmission parameters intended to be used for the transmission of a multicast control message, and
- each unicast physical control channel being encoded using a network temporary identifier uniquely identifying the terminal to which it is intended,
- the multicast control message carrying at least two sets of transmission parameters intended to be used for the transmission of payload data to the at least two terminals respectively.

2. The method according to claim 1, wherein the sets of transmission parameters identify at least one same time-frequency resource associated with the transmission of payload data to at least two of the terminals.

3. The method according to claim 1, wherein the multicast control message is scrambled by a scrambling sequence specific to a cell controlled by the base station, and in that the scrambling sequence is transmitted in at least one of the unicast physical control channels.

4. The method according to claim 1, wherein the multicast control message is encoded while taking account of the conditions of reception of the terminals.

5. The method according claim 1, wherein the unicast control message has a specific format, and is transmitted over at least one time-frequency resource distinct from a time-frequency resource used to transmit a unicast control message of the same size according to a predefined format.

6. The method according to claim 1, wherein at least one of the unicast physical control channels conveys an indicator signalling that the sets of transmission parameters are transmitted in another channel, the indicator belonging to a group comprising:

a specific sequence inserted in a field of the unicast control message, and a specific network temporary identifier uniquely identifying the destination terminal of the unicast physical control channel and signalling that the sets of transmission parameters are transmitted in another channel.

7. The method according to claim 1, wherein the unicast control message has a specific size, distinct from the size of a unicast control message according to a predefined format.

8. The method according to claim 1, wherein:

the network temporary identifier is of a Radio Network Temporary Identifier (RNTI) type, the physical control channels are of a Physical Downlink Control Channel (PDCCH) type, and the unicast and multicast control messages are of a Downlink Control Information (DCI) type.

9. A reception method intended to be implemented by a terminal attached to a base station implementing the following:

decoding a unicast physical control channel intended for the terminal, using a network temporary identifier uniquely identifying the terminal, the unicast physical control channel conveying a unicast control message carrying transmission parameters intended to be used for the transmission of a multicast control message, the multicast control message carrying at least two sets of transmission parameters, including a first set of transmission parameters intended to be used for the transmission of payload data to the terminal and a second set of transmission parameters intended to be used for the transmission of payload data to another terminal attached to the base station, decoding the multicast control message transmitted using the transmission parameters carried by the unicast control message, and receiving a useful signal originating from the base station, transmitted using the first set of transmission parameters.

10. The method according to claim 9, wherein the method implements the reconstruction of at least one signal interfering with the useful signal, based on the second set of transmission parameters, and the subtraction of the interfering signal from the useful signal.

11. The method according to claim 9, wherein the method implements a descrambling of the multicast control message based on a scrambling sequence specific to a cell controlled by the base station, transmitted in the unicast physical control channel.

12. The method according to claim 9, wherein the method implements, prior to decoding the multicast control message, detecting an indicator conveyed by the unicast physical control channel or a specific size of the unicast control message conveyed by the unicast physical control channel, signalling that the sets of transmission parameters are transmitted in another channel.

13. A base station configured to transmit signalling information to at least two terminals attached to the base station, comprising means for transmitting at least two unicast physical control channels each intended for one of the at least two terminals, each unicast physical control channel conveying a unicast control message carrying transmission parameters intended to be used for the transmission of a multicast control message, and each unicast physical control channel being encoded using a network temporary identifier uniquely identifying the terminal to which it is intended, the multicast control message carrying at least two sets of transmission parameters intended to be used for the transmission of payload data to the at least two terminals respectively.

14. A terminal configured to be attached to a base station, comprising:

means for decoding a unicast physical control channel intended for the terminal, using a network temporary identifier uniquely identifying the terminal, the unicast physical control channel conveying a unicast control message carrying transmission parameters intended to be used for the transmission of a multicast control message, the multicast control message carrying at least two sets of transmission parameters, including a first set of transmission parameters intended to be used for the transmission of payload data to the terminal and a second set of transmission parameters intended to be used for the transmission of payload data to another terminal attached to the base station, means for decoding the multicast control message transmitted using the transmission parameters carried by the unicast control message, and means for receiving a useful signal originating from the base station transmitted using the first set of transmission parameters.

15. A processing circuit comprising a processor and a memory, the memory storing program code instructions of a computer program for executing the method according to claim 1 when this computer program is executed by the processor.

* * * * *